* United States Patent *

Orten et al.

(10) Patent No.: US 7,871,555 B2
(45) Date of Patent: Jan. 18, 2011

(54) METHOD AND DEVICE FOR PRODUCING A PROFILED RIM ON A COMPONENT, AND GLAZING PROVIDED WITH A PROFILED RIM

(75) Inventors: Thomas Orten, Roetgen (DE); Thomas Bischof, Aachen (DE); Gerd Cornils, Merzenich (DE)

(73) Assignee: Saint-Gobain Glass France, Courbevoie (FR)

( * ) Notice: Subject to any disclaimer, the term of this patent is extended or adjusted under 35 U.S.C. 154(b) by 774 days.

(21) Appl. No.: 10/493,212

(22) PCT Filed: Nov. 7, 2002

(86) PCT No.: PCT/FR02/03814

§ 371 (c)(1),
(2), (4) Date: Jan. 14, 2005

(87) PCT Pub. No.: WO03/039836

PCT Pub. Date: May 15, 2003

(65) Prior Publication Data

US 2005/0221060 A1 Oct. 6, 2005

(30) Foreign Application Priority Data

Nov. 7, 2001 (DE) ................. 101 54 553

(51) Int. Cl.
*B28B 7/30* (2006.01)
(52) U.S. Cl. .............. 264/313; 264/165; 264/252; 425/125; 425/126.1

(58) Field of Classification Search ............. 428/192, 428/34, 913, 920; 264/165, 252–259, 313; 296/93; 49/475.1; 52/786; 165/244.11, 165/242, 245; 425/125–126.1
See application file for complete search history.

(56) References Cited

U.S. PATENT DOCUMENTS 4,732,553 A * 3/1988 Hofer ..................... 425/116
(Continued)

FOREIGN PATENT DOCUMENTS

DE 100 21 808 10/2001
(Continued)

OTHER PUBLICATIONS

U.S. Appl. No. 11/136,357, filed May 25, 2005, Orten, et al.

*Primary Examiner*—Patricia L Nordmeyer
*Assistant Examiner*—Prashant J Khatri
(74) *Attorney, Agent, or Firm*—Oblon, Spivak, McClelland, Maier & Neustadt, L.L.P.

(57) ABSTRACT

A method for producing a profiled bead made of a plastic, particularly of a polymer, on a piece, particularly on a window pane. In the method at least a partial portion of an edge region or lateral face region of a surface of the piece is brought into contact with a forming face. The plastic is deposited stuck to at least part of the periphery of a surface of the piece untouched by the forming face and the external dimensions of the profiled bead formed are also defined by the forming face. The forming face is pressed against the edge region or lateral face region of the fixed piece using a flat support, the shape of which can vary under the pressure of a fluid. This then gives a better matching of the forming face to the contour and to any dimensional discrepancies of the piece.

23 Claims, 2 Drawing Sheets

U.S. PATENT DOCUMENTS

| | | |
|---|---|---|
| 4,854,599 A | 8/1989 | Barteck |
| 4,915,395 A * | 4/1990 | Barteck ...................... 277/637 |
| 5,061,429 A * | 10/1991 | Yoshihara et al. ........... 264/252 |
| 5,108,687 A * | 4/1992 | Jourquin et al. ............. 264/279 |
| 5,421,940 A | 6/1995 | Cornils et al. |
| 6,071,108 A * | 6/2000 | Gohr et al. .................. 425/116 |

FOREIGN PATENT DOCUMENTS

DE  10021808 A1 * 10/2001

\* cited by examiner

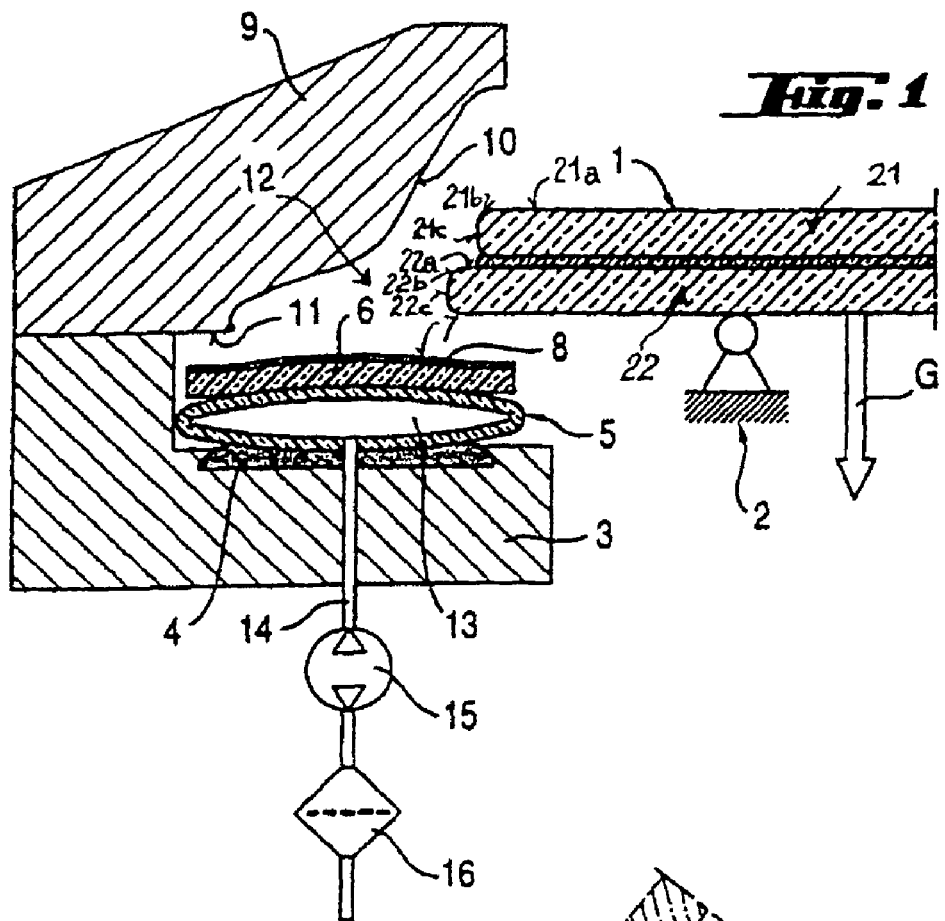
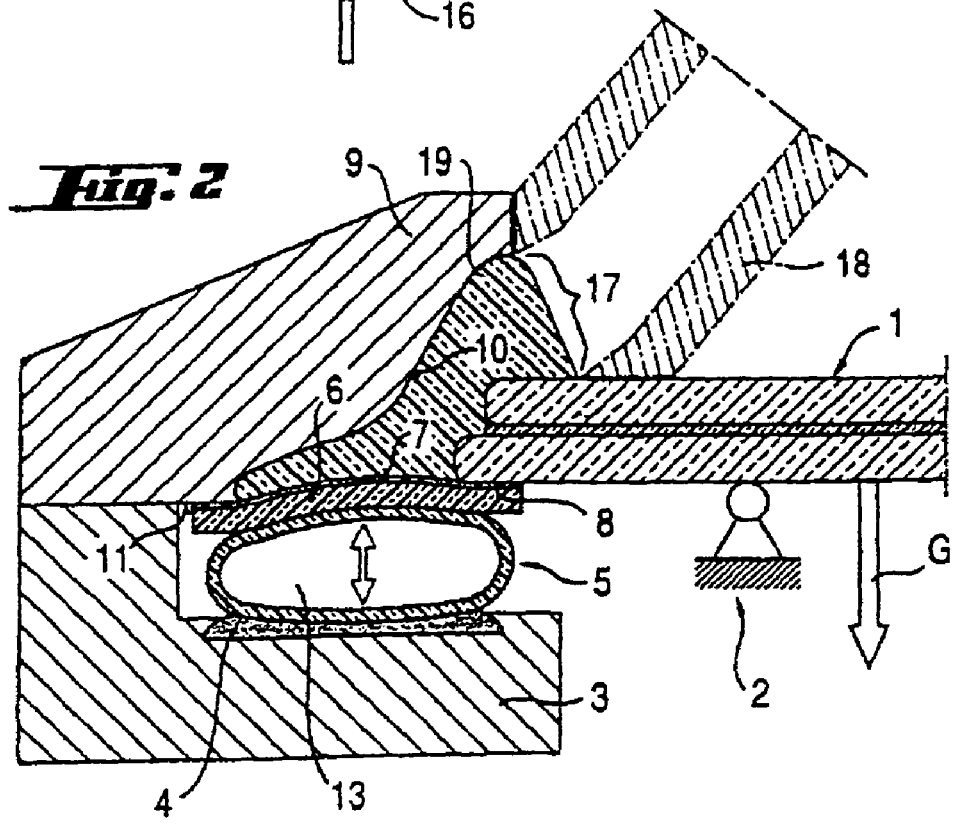

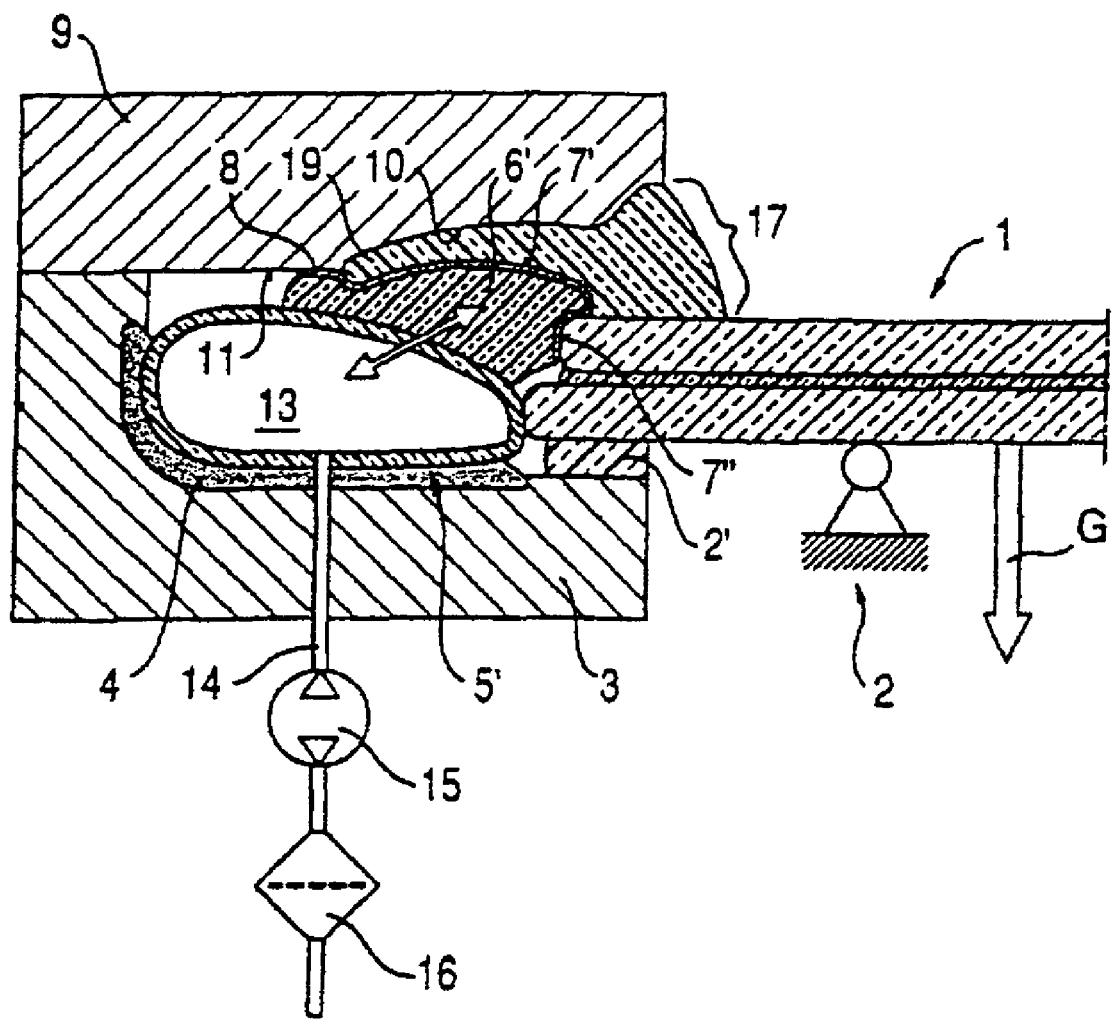

METHOD AND DEVICE FOR PRODUCING A PROFILED RIM ON A COMPONENT, AND GLAZING PROVIDED WITH A PROFILED RIM

The invention relates to a method for producing a profiled bead on a piece, having the characteristics of the preamble of claim 1. It also relates to a suitable device for implementing the method, and to glazing that can be obtained using the method.

Various methods for equipping solid pieces, and also window panes, for example glass and/or plastic window panes, with a plastic profiled bead, for example made of a thermoplastic elastomer, which sticks to one of the (main) faces of the piece are known. Applied to window panes near their edge, the profiled bead sometimes also covers the lateral face thereof. In this instance, the methods with which a smooth connection in continuity with the surface of the profiled bead with a main face of the piece untouched by this bead can be achieved are particularly beneficial.

Document DE-C1-42 32 554 discloses a method of this nature in which a window pane is set down on a heated metal forming cradle and then provided, in an operation using a robot-guided nozzle, with a profiled bead having the desired cross section covering the edge of the upper main face and of its lateral face. The forming cradle may comprise an elastic rest, which is able to compensate for small dimensional differences between the window pane and the forming cradle.

Document DE-A1-41 03 047 describes a similar method for applying a framing profiled section to the edge of a window pane, in which method a trough-shaped forming tool is first of all filled with a partial quantity of the plastic, from which the framing profiled section is produced. Next, the window pane is placed on the tool and its main face is brought into contact with the plastic. Next, additional plastic is added using a nozzle, until the desired cross-sectional shape of the framing profiled section is achieved. The mold may be flexible, so that it can conform to the outline of the edge of the window pane. In each case, however, it is also made up of a mold part with a fixed contour which may, if need be, remain by way of protection on the window pane until such time as this window pane is fitted.

Document DE-A1-43 26 650 A1 describes another method for producing a profiled bead, which is deposited along the edge of a window pane using an extrusion nozzle with a mouth-shaped opening. The profiled bead may have a U-shaped or L-shaped cross section which covers at least a main face on the side of the edge and the lateral face (narrow edge face) of the window pane which attaches thereto and which as appropriate attaches flat (as a continuity of the surface) with the other main face of the window pane.

In the known methods, it is not possible, because of the dimensional discrepancy of the window panes and of their edges respectively, by comparison with the theoretical contour, to avoid the local formation between the mold, and respectively the mouth of the nozzle, and the face of the plate, of gaps via which the pressurized plastic that is to be fashioned escapes. This plastic can then stick at undesirable locations to the face of the plate. As a result, additional operations are required (removal of material, cleaning of window panes) which prove to be extremely troublesome and expensive, especially in fully mechanized working processes.

Document DE-A1-10021808 discloses an injection mold designed to produce a flush-fitting molded seal on a plate of glass. The mold comprises a tolerance-compensating system arranged between an upper mold element and a lower mold element, which accommodates the edge of the plate, forming a seal. This system comprises a thick shoe mounted on a spring or having a hollow space giving a little flexibility. The hollow space may be placed at a reduced pressure or filled with gas or liquid. With this technique, it is necessary to exert pressure on the glass plate, via the upper half mold, which pressure is transmitted by the glass to the shoe to form a leak tight seal.

The object of the invention is to provide a method for producing a profiled bead on a piece using a forming surface, in which method the conformation of the forming surface to the piece is further enhanced, and to provide a device which is particularly well suited to implementing the method.

According to the invention, this objective is achieved, as far as the method is concerned, by the characteristics of claim 1. The characteristics of claim 11 disclose a corresponding device. The invention also relates to glazing having the characteristics of claim 22. The characteristics of the sub-claims attached to each of the independent claims disclose advantageous embodiments of these subjects.

Good conformation of the forming surface around the entire contour or just part of the contour of the piece to be equipped with the profiled bead can now be obtained through the fact that a forming face is combined with a flat support that can be deformed by a fluid pressure (fluid is to be understood as meaning gases or liquids with equal preference), the forming face being pressed against the piece, or respectively against its lateral face, by inflating the support once the piece has been fitted and fixed. The forming face may also, under the uniform pressure of the support, conform to any irregularities there may be in the face or lateral face of the piece facing it. Naturally, the piece itself is at the same time fixed in its position in an appropriate way, for example using opposed supports or mating rests, so that it cannot escape the pressure of the forming face by the pressure of the fluid.

This method can be applied equally to the extrusion of the profiled bead in situ from a plastic using a relative movement between the extrusion nozzle and the edge of the piece or, respectively, the forming face applied thereto, and to the injection of a plastic into a closed mold (injection molding) which defines the desired profiled section contour. The latter method naturally assumes a precise matching of the pressures of the injection mechanism and support so that the latter does not give way under the injection pressure.

A plastic here is to be understood as meaning any material with which a profiled bead, of defined and durable cross section, can be formed by extrusion or injection. As a general rule, use is made of polymer plastics, preferably thermoplastic polymers, elastomers, two-part polyurethane polymers, etc. These also exhibit satisfactory resistance to the high levels of stress encountered in use (changes in temperature, mechanical vibrations, solar radiation, etc.).

The forming face may be secured as one constructional entity to the support, and may even form an integral part of the support. In one embodiment, a mold part comprising the forming face may be in the form of a relatively thin strip, flexible in the longitudinal direction but relatively rigid in the transverse direction and fixed, for example by bonding or vulcanizing, to a support in the form of a tube or flexible hose. The support for its part rests on a rigid support frame or the like, the periphery of which corresponds more or less to the line of the outline of the piece to be equipped with the profiled bead, for example a window pane. If need be, use may also be made of other cross sections which are stronger than the strips.

In another embodiment, the mold part comprising the forming face is incorporated directly into the support. It is, for example, possible to extrude a profile in the form of a tube or a flexible hose, which incorporates, into a single piece, both the support, which has relatively thin walls that can be deformed under a fluid pressure, and the forming face which has a thicker cross section, externally shaped in the desired way.

In a third alternative form, the forming face forms part of an independent mold part, separate from the support, which is positioned appropriately near the piece that is to be equipped with the profiled bead, in such a way that it can be pressed by the support against a face or a lateral face of the immobilized piece. In this particular instance, the mold part in its entirety may be fixed, for example when it is already in contact with the piece and provides the necessary conformation as a result of its elastic deformation alone, or alternatively it may be driven by the support from a lowered rest position into a raised position.

In yet another alternative form, a mold part comprising the forming face with the required cross-sectional shape, may be fixed to a membrane the surface area of which is slightly greater than the face of the piece, or of the window pane respectively. In this case, only said mold part needs to conform, at one or several parts specifically to the contour of the piece, or of the window pane, respectively, while the membrane would be universally useable as a support for several shapes of pieces. The forming face in this case may be fixed to the membrane, for example by bonding using detachable adhesives, Velcro strips or the like in the desired position, supported for example by jigs. The membrane may thus form the wall of a bearing compartment or the like, which can be supplied with fluid under pressure. The window pane is positioned on the membrane or on the mold part or parts respectively, and immobilized. In particular, it is prevented from escaping by appropriate mating rests. Next, the membrane is pressed against the window pane by the fluid pressure, and then the forming face of the mold part is pressed appropriately against the piece applied to the membrane, or against the edge of the latter, respectively.

The mold part itself, or its forming face, may be made of any appropriate material. It goes without saying that no degradation of the surface of the piece that is touched may occur as a result of the contact between the forming face and the piece. By way of a mold part use may be made of a semi-hard flexible rest, for example one made of PTFE (Teflon) or spring steel. In particular, mold parts made of plastic may be strengthened and stiffened using layers of fabric (for example fiber glass) or metal (aluminum, steel).

In theory, it is true that the position in which the piece is provided with the profiled bead is of little importance. However, it will advantageously be positioned in such a way that the profiled bead is directed more or less horizontally while it is being produced, so as to prevent the as-yet unsolidified plastic from running in the longitudinal direction of the profiled bead. The forming face may then be applied from above, from below and/or from the side to the narrow edge face of the piece, or of the window pane, respectively.

In most cases, it is appropriate to provide a mating mold, which represents the other wall of the forming cavity that is to be produced, opposite the forming face which defines the cross section of the profiled bead.

The fluid, which may be a gas, for example air in the simplest scenario, or alternatively a practically incompressible hydraulic fluid, is sent into the hollow space of the support preferably using a dual pressure pump which can quickly suck the fluid out again once the profiled bead has been formed and solidified, so as to empty the support and break the contact between the forming face and the window pane and the profiled bead (so as to "demold" the profiled bead).

With the method according to the invention and with appropriate devices it is possible to equip pieces of all kinds made of various materials (glass, ceramic, plastic, metal) with a profiled bead, these pieces furthermore not being merely flat but also window panes with tolerances of curvature wider than is currently the case (crinkling at the edge in a direction normal and parallel to their surface). Discrepancies regarding the so-called "end tangent" angle in curved window panes— that is to say the angle formed by a tangent to the edge of the window pane with respect to the assumed plane of the window pane—are fully compensated for, something which can be achieved only to a limited extent with rigid forming faces used in the prior art. Likewise, the window panes are no longer in contact with a hard lower mold which means that any damage to the smooth surfaces of the piece is avoided.

In the case of vehicle window panes it is possible to extrude or to inject profiled cross sections with a spacing part facing away from the side of the bodywork and a sealing lip possibly extending over the edge of the window pane, flush with the lateral face without having the slight setback from the lateral face that has hitherto been necessary, the lateral face of the glass remaining entirely visible.

Again in the case of vehicle window panes, it is possible to produce profiled cross sections which cover a space between the narrow edge face (lateral face) of the window pane and the bodywork panel, in such a way that a smooth, discontinuity-free transition is created between the face of the window pane and the portion of profiled section to which it connects.

Likewise, the visible exterior face of the lip that covers the slot may be curved in a simple way predetermined by the forming face.

Finally, the visible exterior face of the profiled bead no longer has any flash as is caused in the known methods by rims on the forming face of the tool.

The visible exterior face of the profiled bead may exhibit any surface structures whatever, by giving the forming face the corresponding structure in negative.

The flexible tool described is suited to fashioning profiled beads both on laminated window panes (for example on laminated safety glass) and on monolithic window panes (safety glass, particularly toughened safety glass). Thin pieces made of hard plastic may also be equipped with a profiled bead serving as a sealing lip or the like, using the method and the tools described.

Other details and advantages of the subject of the invention will become apparent through the drawings of an exemplary embodiment and through the detailed description which follows. It goes without saying that profiled beads may also be fashioned using the method of the invention on pieces which are not in the form of window panes. In this instance, these may just as easily be shaped pieces, on which a plastic sealing gasket needs to be fashioned, or compartments that need to be provided with a profiled molding, etc.

The applications described hereinabove relate to the equipping of vehicle window panes with a profiled bead, without any implied limitation.

In the drawings, which are simplified depictions:

FIG. 1 shows a cross section of a part view of a first embodiment of a device with a forming face supplied to a support in the form of a flexible hose, which is withdrawn from a window pane fixed in the device by relaxation of the pressure inside the support;

FIG. 2 shows the same cross section as FIG. 1, but this time with the forming face applied against the window pane using the support, so as to fashion a profiled bead covering the lateral face of the window pane and attaching to one of the main faces of this pane as a flush fit; and FIG. 3 illustrates a second embodiment of the device, also in cross section, using which a profiled bead is fashioned on a window pane, with a lip extending freely on the lateral face of the window pane, but which does not however touch the lateral face of the window pane.

According to FIG. 1, a window pane 1, which here consists of a laminated window pane with two rigid individual sheets 21, 22 of glass and/or of plastic and a layer of adhesive joining these together, is placed in an overall horizontal position on an immobile rest 2, simply sketched in, belonging to a processing station. This is, for example, a car windshield. A monolithic glass or plastic window pane or some other object in the form of a plate could just as easily be set down in the device. The window pane 1 is, in addition to its own self-weight, fixed on the rests by appropriate means, for example suckers, in the direction of the arrow G and is thus also held in place laterally. Said means may also press from above onto the face of the window pane, if collisions with other tools are excluded.

We are looking at a section in the edge region of the window pane 1, with a direction of view parallel to one of the lateral intersection corners 21b, 22b, of the lateral faces 21c, 22c respectively thereof. Under the lower edge of the window pane 1 there extends an immobile rigid support frame 3. A support in the form of a flexible hose 5 is fixed to this frame via an intermediate layer 4. Fixed to the upper face thereof is a mold part 6, in the form of a strip or ribbon, the longitudinal direction of which is always parallel to the lateral intersection corner of the window pane 1. Formed on the upper face of the mold part 6 is a forming face 7, which is provided with a non-stick layer 8. The mold part 6 and its forming face 7 are flexible in the longitudinal direction. The forming face 7 extends also under the lower face of the window pane over a short width. Depicted here is a rest position of the device (also to be considered as the loading and unloading position), in which position the support in the form of a flexible hose 5 is free of pressure, or deflated. As an alternative form to that which has been depicted, the support could naturally also be wider than the mold part.

A mating mold 9 is also fixed removably (such that it can pivot as necessary) on the support frame 3. This mating mold has a curved forming contour 10, of which the outer edge, distant from the window pane, bears a support shoulder 11. The inner edge of the mating mold, or respectively the outlet end of the curved contour 10, slightly overhangs the edge of the window pane 1, above its upwardly facing free main face. Between the forming face 7 of the mold part 6, the curved contour 10 of the mating mold 9 and the lateral face of the window pane 1 a cavity 12 is formed which acts as a molding cavity for producing a profiled bead having a predetermined cross-sectional shape. The forming face 7 constitutes a partial wall of this cavity.

As an alternative to that which has been depicted, the rests 2 and the support frame 3 may be combined. For this, it would be possible, on the edge of the support frame 3 that faces toward the window pane 1, to form a rib, either continuous or just along partial portions of the support frame, at isolated points as appropriate, with a defined height, on which the window pane 1 can be set down. At the same time, such a rib can also form a lateral rest against an exhaust of the flexible-hose support toward the window pane 1.

The interior space 13 of the support in the form of a flexible hose 5 is—by way of non limiting schematic example—coupled by a pipe 14 to a reversible dual pressure pump 15 operated by an electric motor and which, when run in one direction draws air from the atmosphere through a filter 16 and dispatches it into said interior space 13. When run in the other direction, the dual pressure pump 15 sucks the air back out of the interior space 13 and discharges it to the atmosphere.

It goes without saying that the interior space 13 may also, as an alternative to this mode of operation, be supplied from a compressed air reservoir, the pressure being established, the pressure level and the expansion being set by controlling valves.

It is also possible to conceive of a hydraulic pressure variation in which use is made, by way of a fluid, of a liquid which is conveyed using appropriate devices, pumps and valves.

Naturally, if need be, it is possible to provide more than one supply and exhaust station for the fluid with respect to the interior space 13, which stations are possibly distributed along the length of this space.

FIG. 2 shows the "work position" of this same device. The interior space 13 of the support 5 is now under fluid pressure. The pressure can be maintained for example by the dual pressure pump operating continuously or by closing a shut-off valve (the latter is not depicted in FIG. 1). If use is being made of a hydraulic fluid, the support 5 could, by blocking the fluid, form a practically incompressible rest for the mold part 6, keeping the latter immovably on the face of the window pane even against the effect of the injection pressure when the profiled bead made of plastic is being injected. Under the influence of the rise in pressure in the interior space 13, the forming face 7, or, respectively, the rest faces contiguous thereto on both sides, is pressed on the one hand against the lower face of the window pane 1 and, on the other hand, against the support shoulder 11. Here, the raising movement needs only to be vertical (if the window pane and the support frame are in a roughly horizontal position). The cavity 12 can now be seen up to a slot 17 between the mating mold and the main face 21a, or the upper face of the window pane 1, respectively. The forming face 7 is applied fully, because of its flexibility in the longitudinal direction, on the one hand to the face of the window pane and on the other hand to the support shoulder. No slot and no open leak then remains. The mold part 6 is relatively rigid in its transverse direction, which means that it can "flex" vertically very little, if at all, when a pressure from the cavity 12 acts on it.

It can also be seen that the end of the curved contour 10 is nicely rounded in the direction of the support shoulder 11. Thus, it is possible to avoid flash occurring at the tip of the sealing lip that is to be produced on the profiled bead, in the transition between the forming face and the curved contour. A non-stick agent will also be deposited, in a way known per say, on the surface of the curved contour, so that this surface can be detached from the profiled bead once the latter has been produced.

Through the slot 17 it is now possible to introduce, in a way known per se, a mass of plastic 19 into the cavity 12, using an extrusion nozzle 18 indicated only in broken line. This plastic is formed at this point into a profiled bead with the desired cross section. The nozzle is, as described, in the aforesaid document DE-C1-42 32 554, and preferably with the aid of a robot, guided along the slot for the length that has to correspond to the length of the finished profiled bead, that is to say over at least part of the periphery of the window pane or over the entire periphery of the window pane. It may, for guidance, rest against the two sides of the slot 17 on the upper main face of the window pane and on the mating mold 9. Transitions, respectively at the start and end of the profiled bead, are possibly finished off in the way known per se.

As an alternative to that which has been depicted, the extrusion nozzle 18 could just as easily predetermine the cross-sectional profile of the profiled bead, at least partly in place of the curved contour 9, here fixed. It would be possible, depending on the desired transverse configuration for the profiled bead, even to entirely dispense with a mating mold or upper mold, because the extrusion nozzle itself, or the nozzle orifice, can form the theoretical contour during extrusion and because at the same time the forming face is still supported on the support shoulder or on an equivalent piece.

The finished solidified profiled bead sticks at least to the edge of the upper main face of the window pane 1, which has been provided in this region with a sticking agent, in a way known per se. In the case of monolithic window panes, the mass of plastic in this profiled cross section may also stick to the lateral face thereof. With laminated window panes, this sticking to the lateral face may be countered using appropriate means, so that the layer of adhesive can remain ventilated. These means (for example non-stick coatings, masks and the like) can be combined without difficulty with the methods described here and with the device illustrated, that are not, however, depicted here.

It can be seen that the profiled bead formed is connected almost continuously to the lower main face of the window pane 1. The slightly convex forming face gives it a concave exterior contour which is highly suitable for, with this window pane 1 fitted, covering as a flush-fit a slot between the face of the window pane and the bodywork panel contiguous with the window opening (slot cover strip). The very thin lip extending freely from the outlet of this profiled cross section is supported in a stable position by the forming face 7 while the plastic is being deposited and while it is solidifying.

Above the upper main face 21a, the profiled bead forms a loop or, viewed in longitudinal direction, a wall, which acts as a spacer piece (spacer) in a way known per se, in order to maintain a predetermined distance between the interior face of the window pane and the mounting flange of the window opening, to which the window pane is bonded in a way also known per se. The customary opaque surround generally found in car windows, which visually conceals the profiled bead and the line of adhesive used for mounting and which protects them against UV radiation, has not been depicted here.

In this configuration of the device and of the profiled bead, the mold part 6 can be made of a single piece in the form of a frame without a connection—each time for a given window pane contour—and be combined with a piece support in the form of a flexible hose or of a membrane. Naturally, a mold part made in a single piece may also be combined with several support portions, which may preferably be operated synchronously using the fluid. Even when the window pane does not need to be equipped with a profiled bead except over part of its periphery, it is nonetheless possible for this to use a complete mold part, because the length of the profiled bead is determined by the travel of the extrusion nozzle, not by the mold part. Naturally, the mold part may also be manufactured individually for the respective length of the profiled bead.

According to another alternative form of the device, which is now illustrated in its work position in FIG. 3, the method according to the invention is used to produce a pure "profiled section with spacing lip" with no slot overlap. The profiled bead thus designed sticks only to the main face 21a of the window pane 1 situated facing a support 5'. Here again, a lip is fashioned that extends freely over the perimeter of the window pane. The latter is, however, in the case of "vehicle bodywork" mounting, in the depth of the slot between the lateral face (now free) of the window pane and the face of the bodywork.

Unlike in the configuration according to FIGS. 1 and 2, the mold part 6' here is applied to the lateral intersection corner, or to the lateral face of the window pane 1. That requires certain changes by comparison with the arrangement described before. Particularly in the case of laminated window panes, the side, or the exterior periphery of the rigid window pane 21 subsequently placed on the inside, is usually set back slightly, as illustrated here, from the window pane 22 subsequently placed on the outside. Given that the profiled bead needs to stick to the main face 21a situated on the inside, the mold part 6' is brought up at an angle from the bottom to the lateral face 21c of the window pane concerned (in this instance the upper pane) (the space above the window pane needs to be clear for other tools, particularly for the robot arm that guides the extrusion nozzle). On the one hand, this is taken into consideration by a corresponding design of the deformation of the support in the form of a flexible hose 5' as it is pressurized. This can be seen visually in the form of a double-handed arrow drawn in the interior space 13 of the support 5'. The advance of the mold part therefore has also, in addition to a vertical component—as in FIGS. 1 and 2 already—a radial horizontal component toward the inside in the direction of the lateral face of the window pane. The oblique position of the direction of advance of the mold part 6' is here depicted in an exaggerated fashion for clarity.

Furthermore, the configuration of the mold part 6' itself is tailored to this application. Beside a forming face 7' modified in accordance with the application, it also comprises a lateral resting face 7" which can be applied as smoothly and with as good a seal as possible, against the lateral face of the window pane 1. Unlike the mold part 6 in FIGS. 1 and 2, the mold part 6' should be able to conform elastically, even in the transverse direction, to any ripple or curvature in the lateral face of the window pane 1. Ripples at this point are, however, extremely small in size as a general rule because the intersection corners of the window pane are ground using an automatic machine after breakage. The mold part 6' itself may advantageously be made relatively rigid in the transverse direction and equipped with a thin elastic layer (not depicted) on just the resting face 7", which is sufficiently elastically deformable against the lateral face of the window pane under the pressure of the support to guarantee the desired conformation. Naturally, this elastic rest must not stick to the plastic of the profiled bead either.

In the work position, the mold part 6' presses on the one hand again against the support shoulder 11 of the mating mold 9, and, on the other hand, with a not insignificant force, against the lateral face 21c of the window pane 1. At the same time, the support 5' itself may also press lightly against the lateral face 22c of the rigid lower window pane. The lateral resting face 7" of the mold part 6' is preferably configured in such a way (concave) that in the work position it mates with the lateral face of the window pane 1—ground with a rounded portion (convex shape) in cross section—or with its rigid upper window pane respectively. Thus, the force of adhesion of the support in the vertical direction is enhanced during the filling of the mass of plastic 19 into the cavity 12. Finally, a rest 2' is also provided in the form of a plastic block or a plastic molding supporting the lower face of the window pane 1 by being placed, in the way already mentioned, on the inner edge of the support frame 3.

With this design of the mold part 6', the profiled bead may, in a particularly advantageous way, be placed practically immediately on the intersection 21b between the upper main face 21a and the lateral face 21c of the window pane. With conventional extrusion methods it is necessary to keep a slight setback at this point.

Naturally, it is also possible, for another appropriate configuration of the mold part, to deposit the profiled bead with a greater or lesser width partly on the lateral face 21c of the rigid upper window pane 21, or also of the protruding part of the internal surface (on the same side as the adhesive material) 22a of the rigid lower window pane 22. The material of the profiled bead is then bounded by the intersection 22b between the internal main face 22a of the lower window pane 22 and the lateral face 22c of the lower window pane 22.

All the intermediate steps that fall between the "extremes" illustrated in FIGS. 2 and 3, are possible, especially with monolithic window panes. It is, for example, possible also to press the mold part against the lower side of the rigid lower window pane and at the same time to partly cover the lateral face pressed against it using a modified resting face of the mold part.

The other auxiliary conditions for this configuration correspond to those of the embodiment according to FIGS. 1 and 2, which means that there is no need to return to them in any detail here.

If the profiled bead is to be laid down without interruption around one or more corners of the window pane 1 using this kind of device, the corner regions of the mold part 6' then incur certain additional costs. The mold part 6' could be split into several individual portions, for example one for each side of the window pane, and these portions could be placed one against the other only in the work position, whereas they could be parted from one another in the rest position because of the diagonal lifting movement. Then, it would nonetheless be necessary to take steps to ensure as continuous as possible a deposition of these portions (for example nesting elements such as tooth sets, slides, etc). Each portion may then be operated for example by its own support controlled by a fluid.

Considering that the diagonal movement is, however, here depicted in an exaggerated fashion, the mold part may also in practice, in this embodiment, be made as a single piece. In the corner regions, elastic portions can be fashioned continuously in the longitudinal direction and these can, on the one hand, be applied without discontinuity to the window pane in the corners thereof and, on the other hand, can be deformed enough when in the parted rest position that they do not impede the complete separation of the mold part and of the window pane. This "demolding" can be enhanced for example by here again combining with each portion of the one-piece mold part, a fluid-controlled support, this plurality of supports being forcibly operated, also in the return direction (for example by causing a reduced pressure using a dual pressure pump), and thus enhancing the separation movement.

The invention claimed is:

1. A method for producing a profiled bead made of a plastic on a piece, comprising:
    positioning a flexible mold including a forming face and a flexible support on a support frame, wherein the forming face is supported by the flexible support which has a shape that can vary under pressure of a fluid;
    fixing the piece with respect to the support frame via rests positioned beneath the piece such that the forming face is not pressed against the piece when the flexible support is not inflated by the fluid;
    positioning a mating mold on the support frame such that the mating mold is in contact with the support frame and the forming face is not pressed against the mating mold when the flexible support is not inflated by the fluid;
    after the fixing the piece and the positioning the mating mold, inflating the flexible support with the fluid such that the forming face moves from a position not pressed against the mating mold or the piece to a position in contact with at least a partial portion of an edge region or lateral face region of a surface of the piece and the mating mold to form a cavity in which the plastic is deposited without the mating mold contacting the piece; and
    depositing, in the cavity, the plastic to be stuck to at least part of a periphery of the surface of the piece not covered by the forming face and defining external dimensions of the profiled bead by the forming face and the mating mold.

2. The method as claimed in claim 1, wherein the inflating the flexible support includes pressing the forming face of the flexible mold in a longitudinal direction, using the flexible support, against the piece such that the forming face is able to mate, without a seal, with the surface of the piece.

3. The method as claimed in claim 1, wherein the flexible support is controlled with the fluid pressure both to apply the forming face against the piece and to separate the forming face from the piece.

4. The method as claimed in 1, wherein the forming face is used to form and to support a flexible lip of the finished profiled bead, extending freely from the piece.

5. The method as claimed in claim 1, wherein the forming face is pressed against one side of the piece using the flexible support and is used to form a profiled bead on a face attached to the one side.

6. The method as claimed in claim 1, wherein the forming face is pressed against a face of the piece using the flexible support, to protect at least part of the face from the plastic of the profiled bead.

7. The method as claimed in claim 1, wherein the forming face is pressed by the flexible support against the piece and against a support shoulder of the mating mold thus fixed with respect to the support frame.

8. The method as claimed in claim 1, wherein the profiled bead is produced by extruding the plastic in contact with the forming face, and the plastic is prevented from sticking to the forming face.

9. The method as claimed in claim 1, wherein the profiled bead is produced by extruding or injecting the plastic into the cavity, in which the forming face forms at least a wall part, and in which the plastic is prevented from sticking to walls of the cavity.

10. The method as claimed in claim 1, wherein the profiled bead is fashioned on a window pane, and means for preventing the plastic, or the resulting profiled bead, from sticking to a lateral face of the window pane which is covered by the plastic or the resulting profiled bead is used.

11. The method as claimed in claim 1, further comprising:
    positioning an intermediate layer between the flexible support and the support frame, wherein
    the positioning the flexible mold includes positioning a part of the intermediate layer below a lower lateral face region of the surface of the piece and substantially in parallel with the lower lateral face region, and
    the inflating the flexible support includes pressing the forming face against the edge region of the piece without pressing the forming face against the lower lateral face region of the surface of the piece.

12. A device for producing a profiled bead in a plastic on a piece, comprising:
    a support frame;
    a flexible mold including a forming face supported by a flexible support which has a shape that can vary under pressure of a fluid such that, when the flexible support does not have the fluid therein, the forming face is not positioned in contact with the piece and, when the flexible support does have the fluid therein, the forming face is positioned in contact with the piece, wherein the flexible mold is positioned on the support frame;

means for fixing the piece with respect to the support frame;

a mating mold positioned on the support frame such that, when the flexible support does not have the fluid therein, the forming face is not positioned in contact with the mating mold or the piece and, when the flexible support does have the fluid therein, the forming face is positioned in contact with the mating mold and the piece to form a cavity in which the plastic is deposited; and means for depositing in the cavity the plastic on at least part of a periphery of the piece, in which external dimensions of the formed profiled bead, sticking to a surface of the piece, are defined also by the forming face and the mating mold, wherein the forming face is configured to be pressed against the fixed piece and the mating mold in a direction of extension of the profiled bead that is to be fashioned on the forming face without the mating mold contacting the piece.

13. The device as claimed in claim 12, wherein the flexible support has a cross section in a shape of a flexible hose with an interior space configured to be subjected to the fluid pressure.

14. The device as claimed in claim 12, wherein the flexible support is produced in a form of a membrane, which is a moving wall of a chamber configured to be subjected to the fluid pressure.

15. The device as claimed in claim 12, wherein the support frame that supports the flexible mold extends at least along the part of the periphery of the piece that is to be equipped with the profiled bead.

16. The device as claimed in claim 15, wherein the support frame comprises rests configured to support the piece to be equipped with the profiled bead.

17. The device as claimed in claim 12, wherein the forming face is a surface of a part of the flexible mold, and the forming face is configured to be applied without a seal to the piece by the flexible support in a work position.

18. The device as claimed in claim 17, wherein the flexible mold constitutes a separate piece from the support frame and is assembled fixedly or removably with the support frame or may be driven by the flexible support in the work position.

19. The device as claimed in claim 12, wherein the mating mold is provided to form the cavity extending along the part of the periphery of the piece that is to be equipped with the profiled bead, and an interior contour of the mating mold defines, as the interior contour meets the forming face of the flexible mold, a cross-sectional profile of the profiled bead.

20. The device as claimed in claim 12, wherein the forming face is configured to be applied to one side of the piece using the flexible support, such that the forming face forms a continuation of the surface of the piece contiguous with the one side, beyond a periphery of the one side.

21. The device as claimed in claim 12, further comprising:

an intermediate layer positioned between the flexible support and the support frame, wherein the flexible mold is configured to be positioned in a first position such that a part of the intermediate layer is below a lower lateral face region of the surface of the piece and substantially in parallel with the lower lateral face region, and when the flexible mold is positioned in the first position, the forming face is configured to press against an edge region of the piece without pressing against the lower lateral face region of the surface of the piece.

22. A device for producing a profiled bead of plastic on a piece, comprising:

a support frame;

a flexible mold including a forming face supported by a flexible support which has a shape that can vary under pressure of a fluid such that, when the flexible support does not have the fluid therein, the forming face is not positioned in contact with the piece and, when the flexible support does have the fluid therein, the forming face is positioned in contact with the piece, wherein the flexible mold is positioned on the support frame;

a support unit to fix the piece with respect to the support frame;

a mating mold positioned on the support frame such that, when the flexible support does not have the fluid therein, the forming face is not positioned in contact with the mating mold or the piece and, when the flexible support does have the fluid therein, the forming face is positioned in contact with the mating mold and the piece to form a cavity in which the plastic is deposited; and an extrusion nozzle to deposit in the cavity the plastic on at least part of a periphery of the piece, wherein external dimensions of the formed profiled bead sticking to a surface of the piece are also defined by the forming face and the mating mold, wherein the forming face is configured to be pressed against the fixed piece and the mating mold in a direction of extension of the profiled bead that is to be fashioned on the forming face without the mating mold contacting the piece.

23. The device as claimed in claim 22, further comprising:

an intermediate layer positioned between the flexible support and the support frame, wherein the flexible mold is configured to be positioned in a first position such that a part of the intermediate layer is below a lower lateral face region of the surface of the piece and substantially in parallel with the lower lateral face region, and when the flexible mold is positioned in the first position, the forming face is configured to press against an edge region of the piece without pressing against the lower lateral face region of the surface of the piece.

* * * * *